(12) United States Patent
Chen et al.

(10) Patent No.: US 11,422,411 B2
(45) Date of Patent: Aug. 23, 2022

(54) LIQUID CRYSTAL MATERIAL, LIQUID CRYSTAL DISPLAY PANEL, AND MANUFACTURING METHOD THEREOF

(71) Applicant: TCL CHINA STAR OPTOELECTRONICS TECHNOLOGY CO., LTD, Guangdong (CN)

(72) Inventors: Mei Chen, Guangdong (CN); Xingwu Chen, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/968,651

(22) PCT Filed: Jun. 11, 2020

(86) PCT No.: PCT/CN2020/095506
§ 371 (c)(1),
(2) Date: Aug. 10, 2020

(87) PCT Pub. No.: WO2021/179459
PCT Pub. Date: Sep. 16, 2021

(65) Prior Publication Data
US 2021/0286216 A1 Sep. 16, 2021

(51) Int. Cl.
*G02F 1/1337* (2006.01)
*G02F 1/1341* (2006.01)
(Continued)

(52) U.S. Cl.
CPC ...... *G02F 1/133723* (2013.01); *C09K 19/544* (2013.01); *C09K 19/56* (2013.01);
(Continued)

(58) Field of Classification Search
CPC ............ G02F 1/133723; G02F 1/1341; G02F 1/133397; C09K 2323/00; C09K 2323/02;
(Continued)

(56) References Cited

U.S. PATENT DOCUMENTS

| 2014/0308462 A1 | 10/2014 | Nara |
| 2016/0272888 A1 | 9/2016 | Endou et al. |
| 2020/0056095 A1 | 2/2020 | Jun |

FOREIGN PATENT DOCUMENTS

| CN | 101246282 A | 8/2008 |
| CN | 102311739 A | 1/2012 |

(Continued)

OTHER PUBLICATIONS

Study on Synthesis and Performance of Organosilicon Fluorescent Materials Based on the Mercapto Group Click Reaction.

*Primary Examiner* — Ruiyun Zhang
(74) *Attorney, Agent, or Firm* — Mark M. Friedman

(57) ABSTRACT

A liquid crystal material, a liquid crystal display panel, and a manufacturing method thereof are provided. The liquid crystal material includes negative liquid crystal molecules and one or more thiol polymerizable monomers. The display panel uses a polymer film obtained by polymerization of a click chemistry reaction of a "thiol and double bond" system to anchor an orientation state of the liquid crystal molecules on the substrate surface, with few impurities and a low risk of image sticking displayed on the panel.

9 Claims, 6 Drawing Sheets

(51) Int. Cl.
*C09K 19/54* (2006.01)
*C09K 19/56* (2006.01)
*G02F 1/1333* (2006.01)

(52) U.S. Cl.
CPC ........ *G02F 1/1341* (2013.01); *C09K 2323/00* (2020.08); *C09K 2323/02* (2020.08); *G02F 1/133397* (2021.01)

(58) Field of Classification Search
CPC ...... C09K 19/544; C09K 19/56; C09K 19/04; C09K 2019/0448
USPC ........................... 428/1.1, 1.2, 1.26; 349/123
See application file for complete search history.

(56) References Cited

FOREIGN PATENT DOCUMENTS

| | | | |
|---|---|---|---|
| CN | 106188540 A | | 12/2016 |
| CN | 106632772 A | | 5/2017 |
| CN | 108897173 A | * | 11/2018 |
| CN | 108897173 A | | 11/2018 |
| CN | 109651543 A | | 4/2019 |
| EP | 3072911 | | 9/2016 |
| WO | 2018151529 A1 | | 8/2018 |

* cited by examiner a step S1 of providing a first substrate and a second substrate with a polyimide alignment film, the first substrate is a color film substrate, and the second substrate is a thin film transistor substrate a step S2 of filling the liquid crystal material including negative liquid crystal molecules and one or more thiol polymerizable monomers between the first and second substrates, and adding a double bond branched chain to a polyimide molecular chain of the polyimide alignment films; or filling the liquid crystal material including the negative liquid crystal molecules, the one or more thiol polymerizable monomers, and the one or more double bond polymerizable monomers between the first and second substrates a step S3 of applying a voltage to the liquid crystal material between the first and second substrates, and irradiating the liquid crystal material with an ultraviolet light while applying the voltage to induce a click chemical reaction between thiol polymerizable monomers and the double bond branched chain on the polyimide alignment film, or between the thiol polymerizable monomers and double bond polymerizable monomers, so as to generate a polymer a step S4 of removing the voltage and the ultraviolet light, to complete the manufacture of the liquid crystal display panel

FIG. 1

LIQUID CRYSTAL MATERIAL, LIQUID CRYSTAL DISPLAY PANEL, AND MANUFACTURING METHOD THEREOF

FIELD OF INVENTION

The present disclosure relates to technical fields of liquid crystal display, and more specifically, the present disclosure relates to liquid crystal materials, liquid crystal display panels, and manufacturing methods thereof.

BACKGROUND OF INVENTION

With the development of display technology, a liquid crystal display (LCD) has become the most mature, widely used, industrialized and still rapidly developing display device among many flat panel displays due to its advantages of high image quality, power saving and thin body. For example, the liquid crystal display is widely used in mobile phones, TV, personal digital assistants, digital cameras, notebooks, desktop computers and other consumer electronic products, and has become the mainstream of display devices. Most of the liquid crystal display devices on the current market are backlight liquid crystal displays, including a liquid crystal display panel and a backlight module. The principle of liquid crystal display panel is to place liquid crystal molecules between two parallel glass substrates, control the deflection of the liquid crystal molecules through the voltage difference between the upper and lower glass substrates, and then mount a vertical and orthogonal polarizer, so as to control the light emission rate of the backlight source to generate the image.

Generally, a liquid crystal display panel is composed of a color filter (CF) substrate, a thin film transistor (TFT) substrate, a liquid crystal (LC) liquid crystal sandwiched between the color filter substrate and the thin film transistor substrate, and a frame sealant (sealant).

On the CF substrate and TFT substrate of the liquid crystal display panel, there is a layer of thin film material, the main function of which is to arrange the liquid crystal molecules in a certain direction, and is called an alignment film.

Polymer stabilized alignment (PSA) technology is the most effective multi-domain alignment technology in vertical alignment (VA) liquid crystal displays. It can accurately control the liquid crystal molecules in each area to tilt, avoiding the phenomenon of "fighting" between the liquid crystal molecules. The core of PSA technology is to induce the polymerization of polymerizable monomers in the liquid crystal material to form a uniform polymer film under a voltage applied condition to anchor an orientation state of the liquid crystal molecules on the substrate surface, that is, to form a uniform pretilt angle. However, the currently used polymerizable monomer system is completed by one or more acrylate compounds, and the alignment process which requires two-step ultraviolet curing process. The curing process is cumbersome and time-consuming. The liquid crystal material is greatly damaged by ultraviolet light. Moreover, the conversion rate of the polymerizable monomers is not high, the polymerizable monomers remaining in the liquid crystal greatly reduces a reliability of the display panel, and a risk of image sticking is high.

Therefore, it needs a new type of liquid crystal material to improve the polymerization conditions and reduce the risk of image sticking of the display panel.

SUMMARY OF DISCLOSURE

Technical problems: The embodiment of the present disclosure provides a liquid crystal material, a manufacturing method thereof, and a liquid crystal display panel, which use a click chemical reaction between "thiol and double bond" to prepare a polymer film. The polymerization conditions are more moderate, the introduced impurities are less, and the UV damage to the liquid crystal material is less, so as to reduce energy consumption, improve production capacity, and reduce the image sticking risk of the panel display. In order to solve the existing problems that the curing process of liquid crystal materials is cumbersome, two-step ultraviolet light curing causes the liquid crystal material to be greatly damaged by the ultraviolet light, and the risk of image sticking of the display panel is high.

Technical solutions: Therefore, the embodiments of the present disclosure provide the following technical solutions:

According to a first aspect of the present disclosure, a liquid crystal material is provided, the liquid crystal material, including: a plurality of negative liquid crystal molecules and one or more thiol polymerizable monomers, and a structural formula of the thiol polymerizable monomer is shown in a formula (I):

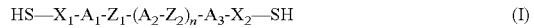

$$HS-X_1-A_1-Z_1-(A_2-Z_2)_n-A_3-X_2-SH \quad (I)$$

wherein, in the formula (I), $X_1$ and $X_2$ are independently selected from a C1-C6 linear alkyl group, or a group thereof having one or a plurality of non-adjacent —$CH_2$— groups of the C1-C6 linear alkyl group substituted with one or more group of —O—, —S—, —COO— and —OCO—;

$A_1$, $A_2$ and $A_3$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and $Z_1$ and $Z_2$ are independently selected from —$CH_2$—, —COO—, —C=C—, or —O—; and wherein n is 0 or 1.

Furthermore, the liquid crystal material further includes one or more double bond polymerizable monomers, and a structural formula of the double bond polymerizable monomer is shown in formula (II):

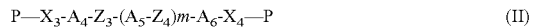

$$P-X_3-A_4-Z_3-(A_5-Z_4)m-A_6-X_4-P \quad (II)$$

wherein, in the formula (II), P is selected from acrylate group, methacrylate group, vinyl ether group, or allyl ether group;

$X_3$ and $X_4$ are independently selected from a C1-C6 linear alkyl group, or a group thereof having one or a plurality of non-adjacent —$CH_2$— groups of the C1-C6 linear alkyl group substituted with one or more group of —O—, —S—, —COO— and —OCO—;

$A_4$, $A_5$ and $A_6$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and $Z_3$ and $Z_4$ are independently selected from —$CH_2$—, —COO—, —C=C—, or —O—; and wherein m is 0 or 1.

Furthermore, a mass percentage of the negative liquid crystal molecules ranges from 98% to 99.95%, and a mass percentage of the one or more thiol polymerizable monomers ranges from 0.05% to 2.0%.

Furthermore, a mass percentage of the negative liquid crystal molecules is 99.5%, and a mass percentage of the one or more thiol polymerizable monomers is 0.5%.

Furthermore, a mass percentage of the negative liquid crystal molecules ranges from 98% to 99.95%, a mass percentage of the one or more thiol polymerizable monomers ranges from 0.05% to 2.0%, and a mass percentage of the one or more double bond polymerizable monomers ranges from 0.05% to 1.0%.

Furthermore, the mass percentage of the negative liquid crystal molecules is 99%, the mass percentage of the one or more thiol polymerizable monomers is 0.5%, and the mass percentage of the one or more double bond polymerizable monomers is 0.5%.

According to a first aspect of the present disclosure, a manufacturing method of a liquid crystal display panel is provided, including:

a step S1 of providing a first substrate and a second substrate each provided with a polyimide alignment film, wherein the first substrate is a color film substrate, and the second substrate is a thin film transistor substrate;

a step S2 of filling the liquid crystal material including the negative liquid crystal molecules and the one or more thiol polymerizable monomers between the first substrate and the second substrate, and adding a double bond branched chain to a polyimide molecular chain of the polyimide alignment films; or filling the liquid crystal material including the negative liquid crystal molecules, the one or more thiol polymerizable monomers, and the one or more double bond polymerizable monomers between the first substrate and the second substrate;

a step S3 of applying a voltage to the liquid crystal material between the first substrate and the second substrate to deflect a plurality of negative liquid crystal molecules and a plurality of polymerizable monomers, and irradiating the liquid crystal material with an ultraviolet light while applying the voltage to induce a click chemical reaction between a plurality of thiol polymerizable monomers and the double bond branched chain on the polyimide alignment film, or between the thiol polymerizable monomers and a plurality of double bond polymerizable monomers, so as to generate a polymer, wherein the generated polymer is deposited on a side of the first substrate facing toward the liquid crystal material to form the first polymer film; and the generated polymer is deposited on a side of the second substrate facing toward the liquid crystal material to form a second polymer film; and a step S4 of removing the voltage and the ultraviolet light, to complete the manufacture of the liquid crystal display panel.

Furthermore, a structural formula of the double bond branched chain is $CH_2=C(CH_3)-COO-$, $CH_2=CH-COO-$, $CH_2=CH-O-$, or $CH_2=CH-CH_2-O-$.

Furthermore, in the step S3, the voltage applied to the liquid crystal material is 10-25V, and the ultraviolet light accumulated light quantity is 3000-7000 mJ/cm².

According to a third aspect of the present disclosure, a liquid crystal display panel is provided, including:

a first substrate as a color film substrate;

a second substrate as a thin film transistor substrate and disposed opposite to the first substrate;

a first polyimide alignment film provided on an inner side of the first substrate;

a second polyimide alignment film provided on an inner side of the second substrate;

a liquid crystal layer disposed between the first polyimide alignment film and the second polyimide alignment film;

a first polymer film formed between the first polyimide alignment film and the liquid crystal layer; and a second polymer film formed between the second polyimide alignment film and the liquid crystal layer, wherein the first polymer film and the second polymer film are formed by a click chemical reaction between a plurality of thiol polymerizable monomers and a double bond branched chain on the polyimide alignment film, or between the thiol polymerizable monomers and a plurality of double bond polymerizable monomers.

Furthermore, a structural formula of the thiol polymerizable monomers is shown in a formula (I):

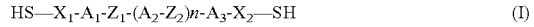
$$HS-X_1-A_1-Z_1-(A_2-Z_2)n-A_3-X_2-SH \qquad (I)$$

wherein, in the formula (I), $X_1$ and $X_2$ are independently selected from a C1-C6 linear alkyl group, or a group thereof having one or a plurality of non-adjacent $-CH_2-$ groups of the C1-C6 linear alkyl group substituted with one or more group of $-O-$, $-S-$, $-COO-$ and $-OCO-$;

$A_1$, $A_2$ and $A_3$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and $Z_1$ and $Z_2$ are independently selected from $-CH_2-$, $-COO-$, $-C=C-$, or $-O-$; and wherein n is 0 or 1.

Furthermore, a structural formula of the thiol polymerizable monomers is shown in a formula (I):

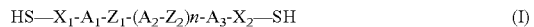
$$HS-X_1-A_1-Z_1-(A_2-Z_2)n-A_3-X_2-SH \qquad (I)$$

wherein, in the formula (I), $X_1$ and $X_2$ are independently selected from $-CH_2-$, or $-CH_2CH_2-$;

$A_1$, $A_2$ and $A_3$ are independently selected from 1,4-benzene ring, or trans-1,4-cyclohexane;

$Z_1$ and $Z_2$ are independently selected from $-COO-$, or $-O-$; and wherein n is 0.

Furthermore, the structural formula of the double bond branched chain is $CH_2=C(CH_3)-COO-$, $CH_2=CH-COO-$, $CH_2=CH-O-$, or $CH_2=CH-CH_2-O-$.

Furthermore, the structural formula of the double bond branched is $CH_2=C(CH_3)-COO-$.

Furthermore, the liquid crystal material further includes one or more double bond polymerizable monomers, and a structural formula of the double bond polymerizable monomer is shown in formula (II):

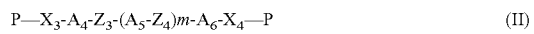
$$P-X_3-A_4-Z_3-(A_5-Z_4)m-A_6-X_4-P \qquad (II)$$

wherein, in the formula (II), P is selected from acrylate group, methacrylate group, vinyl ether group or allyl ether group;

$X_3$ and $X_4$ are independently selected from a C1-C6 linear alkyl group, or a group thereof having one or a plurality of non-adjacent $-CH_2-$ groups of the C1-C6 linear alkyl group substituted with one or more group of $-O-$, $-S-$, $-COO-$ and $-OCO-$;

$A_4$, $A_5$ and $A_6$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and $Z_3$ and $Z_4$ are independently selected from —$CH_2$—, —COO—, —C≡C— or —O—; and wherein m is 0 or 1.

Furthermore, the liquid crystal layer including a plurality of negative liquid crystal molecules.

Furthermore, the first polymer film and the second polymer film are formed by the click chemical reaction between the thiol polymerizable monomers and the double bond branched chain on the polyimide alignment film, and a mass percentage of the negative liquid crystal molecules ranges from 98% to 99.95%, and a mass percentage of the thiol polymerizable monomers ranges from 0.05% to 2.0%.

Furthermore, the first polymer film and the second polymer film are formed by the click chemical reaction between the thiol polymerizable monomers and the double bond branched chain on the polyimide alignment film, and a mass percentage of the negative liquid crystal molecules is 99.5%, and a mass percentage of the thiol polymerizable monomers is 0.5%.

Furthermore, the first polymer film and the second polymer film are formed by the click chemical reaction between the thiol polymerizable monomers and the double bond polymerizable monomers, wherein a mass percentage of the negative liquid crystal molecules ranges from 98% to 99.95%, a mass percentage of the thiol polymerizable monomers ranges from 0.05% to 2.0%, and a mass percentage of the double bond polymerizable monomers ranges from 0.05% to 1.0%.

Furthermore, the first polymer film and the second polymer film are formed by the click chemical reaction between the thiol polymerizable monomers and the double bond polymerizable monomers, wherein a mass percentage of the negative liquid crystal molecules is 99%, a mass percentage of the thiol polymerizable monomers is 0.5%, and a mass percentage of the double bond polymerizable monomers is 0.5%.

Beneficial effect: The beneficial effects of the present disclosure are as follows: the liquid crystal material provided by the present disclosure includes thiol polymerizable monomers. When manufacturing a liquid crystal display panel, a click chemical reaction between "thiol and double bond" is used to prepare a polymer film, wherein the reaction rate is fast, and the conversion rate is high. Moreover, compared with the traditional pure acrylic acid polymerization system, the polymerization conditions (ultraviolet light curing conditions) of the "thiol-double bond" system are more moderate, and the amount of ultraviolet initiator required for the reaction is less, therefore, less impurities are introduced, and the UV damage to the liquid crystal materials is smaller, which effectively reduces energy consumption, improves production capacity and reduces the risk of image sticking of panel display.

DRAWINGS

In order to more clearly explain the technical solutions in the embodiments of the present disclosure, the drawings required in the description of each embodiment will be briefly introduced below. It is apparent that the drawings in the following description are only some embodiments of the present disclosure, for those skilled in the art, without paying any creative work, other drawings can be obtained according to these drawings in the following detailed description of the present disclosure.

FIG. 1 is a flow chart of a manufacturing method of a liquid crystal display panel provided by the present disclosure.

In the drawing,

Figure 2A:
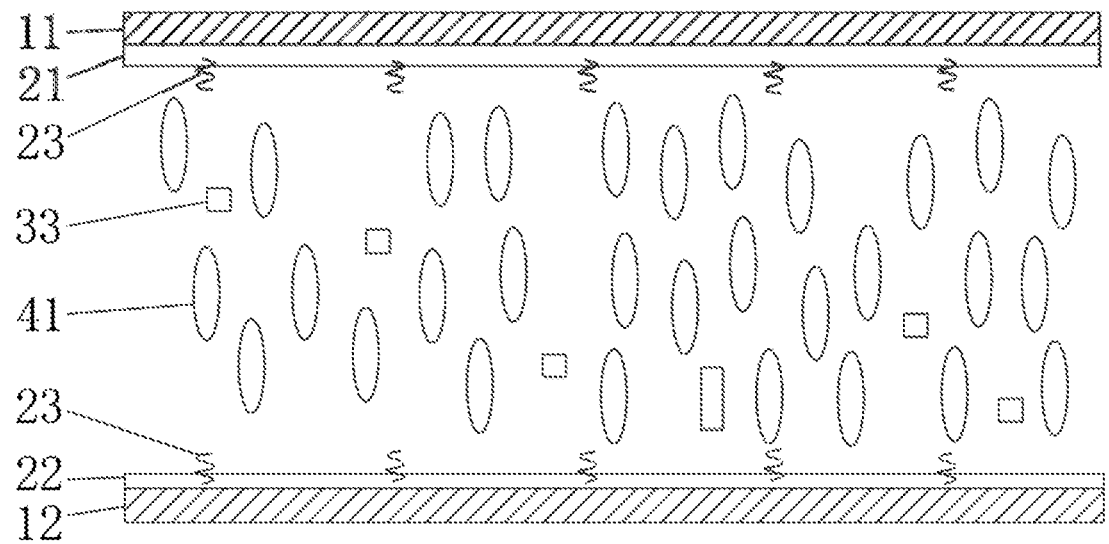
FIG. 2a is a schematic view of a step S2 of a manufacturing method of a liquid crystal display panel of a first embodiment.

11 first substrate; 12 second substrate; 21 first polyimide alignment film; 22 second polyimide alignment film; 31 first polymer film; 32 second polymer film; 33 thiol polymerizable monomers; 34 double bond polymerizable monomers; 23 double bond branched chain; 40 liquid crystal layer; 41 negative liquid crystal molecules; 51 first polarizer; 52 second polarizer.

DETAILED DESCRIPTION OF EMBODIMENTS

The liquid crystal material, the liquid crystal display panel, the manufacturing method thereof, and the technical solution of the liquid crystal display panel provided by the present disclosure will be described clearly and completely in conjunction with the drawings of the specification. It is apparent that the described embodiments are only a part of the embodiments of the present disclosure, not all examples. Based on the embodiments of the present disclosure, all other embodiments obtained by those skilled in the art without making any creative work fall within the protection scope of the present disclosure.

In the present disclosure, the term "exemplary" is used to mean "used as an example, exemplification, or illustration". Any embodiment described as "exemplary" in the present disclosure is not necessarily to be construed as more preferred or advantageous than other embodiments. In order to enable any person skilled in the art to implement and use the present disclosure, the following description is given. In the following description, the disclosure sets out details for the purpose of explanation. It should be understood that those of ordinary skill in the art may recognize that the present disclosure can be implemented even without using these specific details. In other examples, well-known structures and processes will not be elaborated in order to avoid unnecessary details that obscure the description of the present disclosure. Therefore, the present disclosure is not intended to be limited to the illustrated embodiments, but should be consistent with the widest scope consistent with the principles and features disclosed in the present disclosure.

It should be understood that the terms described in the present disclosure are only used to describe specific embodiments and are not intended to limit the present disclosure. In addition, the numerical range in the present disclosure should be understood as specifically disclosing the upper and lower limits of the range and each intermediate value therebetween. Each smaller range between any stated value or intermediate value in the stated range and any other stated value or intermediate value in the stated range is also included in the disclosure. The upper and lower limits of these smaller ranges can independently be included or excluded from the range. Unless otherwise specified, "%" in the present disclosure represents a mass percentage.

Unless otherwise stated, all technical and scientific terms used herein have the same meaning as commonly understood by those skill in the art described in the present disclosure. Although the present disclosure describes only preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated documents, the content of this specification shall prevail.

In addition, the terms "first", "second", "third", etc. are for descriptive purposes only, and cannot be understood as indicating or implying relative importance or implicitly indicating the number of indicated technical features. Thus, features defined as "first", "second", and "third" may explicitly or implicitly include one or more features. In the description of the present disclosure, the meaning of "a plurality of" is two or more, unless otherwise specifically limited.

In the prior art, polymer stabilized alignment (PSA) technology is the most effective multi-domain alignment technology in vertical alignment (VA) liquid crystal displays. It can accurately control the liquid crystal molecules in each area to tilt, avoiding the phenomenon of "fighting" between the liquid crystal molecules. The core of PSA technology is to induce the polymerization of polymerizable monomers in the liquid crystal material to form a uniform polymer film under a voltage applied condition to anchor an orientation state of the liquid crystal molecules on the substrate surface, that is, to form a uniform pretilt angle. However, the currently used polymerizable monomer system is completed by one or more acrylate compounds, and the alignment process which requires two-step ultraviolet curing process. The curing process is cumbersome and time-consuming. The liquid crystal material is greatly damaged by ultraviolet light. Moreover, the conversion rate of the polymerizable monomers is not high, the polymerizable monomers remaining in the liquid crystal greatly reduces a reliability of the display panel, and a risk of image sticking is high.

"Click chemical reaction" has the advantages of fast reaction rates, high conversion rates and high selectivity. It has been widely used in many fields such as drug developments, biomedical materials, photoelectric functional molecular materials, organic functional molecular structures and information systems.

In view of this, the embodiments of the present disclosure provide a new type of liquid crystal material, which includes thiol polymerizable monomers. When using this liquid crystal material to manufacture a liquid crystal display panel, a click chemical reaction between "thiol and double bond" is used to prepare a polymer film, and the "click chemical reaction" between the "thiol and double bond" is applied to a polymer-stabilized liquid crystal system, thereby achieving the anchoring of the orientation of liquid crystal molecules. Compared with pure acrylate polymerization systems, the "thiol-double bond" system of the present disclosure has the advantages that the polymerization conditions are more moderate, and the amount of initiator required for the reaction is less, thereby reducing energy consumption, increasing productivity and reducing the risk of the image sticking displayed on the panel.

Specifically, the present disclosure provides a liquid crystal material, the liquid crystal material including: a plurality of negative liquid crystal molecules and one or more double bond polymerizable monomers, and a structural formula of thiol polymerizable monomer is shown in a formula (I):

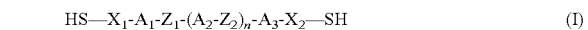

$$\text{HS} - X_1 - A_1 - Z_1 - (A_2 - Z_2)_n - A_3 - X_2 - \text{SH} \qquad (I)$$

wherein, in the formula (I), $X_1$ and $X_2$ are independently selected from a C1-C6 linear alkyl group, or a group thereof having one or a plurality of non-adjacent —$CH_2$— groups of the C1-C6 linear alkyl group substituted with one or more group of —O—, —S—, —COO— and —OCO—; preferably, X1 is —$CH_2$— or —$CH_2CH_2$—, $X_2$ is —$CH_2$— or —$CH_2CH_2$—.

$A_1$, $A_2$ and $A_3$ are cyclic structures, $A_1$, $A_2$ and $A_3$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group (—$CH_2$—), halogen atom and cyan group (—CN); preferably, the halogen atom is —F or —Cl; preferably, $A_1$ is 1,4-benzene ring or trans-1,4-cyclohexane, $A_2$ is 1,4-benzene ring or trans-1,4-cyclohexane, $A_3$ is 1,4-benzene ring or trans-1,4-cyclohexane;

$Z_1$ and $Z_2$ are connecting groups, $Z_1$ and $Z_2$ are independently selected from —$CH_2$—, —COO—, —C=C—, or —O—; preferably, $Z_1$ is —COO— or —O—, and $Z_2$ is —COO— or —O—;

n is 0 or 1; preferably, n is 0.

In which, a mass percentage of the negative liquid crystal molecules ranges from 98% to 99.95%, a mass percentage of the one or more thiol polymerizable monomers ranges from 0.05% to 2.0%. Preferably, the mass percentage of the negative liquid crystal molecules is 99.5%, and the mass percentage of the one or more thiol polymerizable monomers is 0.5%.

In addition to the above-mentioned negative liquid crystal molecules and the one or more thiol polymerizable monomers, the liquid crystal material of the present disclosure also includes one or more double bond polymerizable monomers. A structural formula of the double bond polymerizable monomers is shown in formula (II):

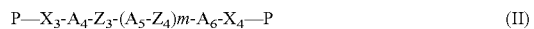

$$\text{P} - X_3 - A_4 - Z_3 - (A_5 - Z_4)m - A_6 - X_4 - \text{P} \qquad (II)$$

In formula (II), P is a reactive group, P is selected from acrylate group ($CH_2$=CH—COO—), methacrylate group ($CH_2$=C($CH_3$)—COO—), vinyl ether group ($CH_2$=CH—O—) or allyl ether group ($CH_2$=CH—$CH_2$—O—);

$X_3$ and $X_4$ are independently selected from a C1-C6 linear-chain alkyl groups, or a group thereof having one or a plurality of non-adjacent —$CH_2$— groups of the C1-C6 linear alkyl group substituted with one or more group of —O—, —S—, —COO— and —OCO—;

$A_4$, $A_5$ and $A_6$ are cyclic structures, $A_4$, $A_5$ and $A_6$ are independently selected from 1,4-benzene ring, 2-5-pyrimidine ring, 1,2,6-naphthalene ring, or trans-1,4-ring Hexane, or selected from a group thereof having one or more active sites in the 1,4-benzene ring, 2-5-pyrimidine ring, 1,2,6-naphthalene ring, or trans-1,4-cyclohexane substituted with one or more of (—$CH_2$), halogen atom and cyan group (—CN); preferably the halogen atom is —F or —Cl;

$Z_3$ and $Z_4$ are linking groups, and $Z_3$ and $Z_4$ are independently selected from —$CH_2$—, —COO—, —C=C— or —O—; and m is 0 or 1.

A mass percentage of negative liquid crystal molecules is 98%-99.95%, a mass percentage of the one or more thiol polymerizable monomers is 0.05%-2.0%, and a mass percentage of the one or more double bond polymerizable monomers is 0.05%-1.0%. Preferably, the mass percentage of negative liquid crystal molecules is 99%, the mass percentage of the one or more thiol polymerizable monomers is 0.5%, and the mass percentage of the one or more double bond polymerizable monomers is 0.5%.

The negative liquid crystal molecules refer to a class of liquid crystal molecules that a dielectric constant in a long axis direction of the liquid crystal molecules is smaller than a dielectric constant in a short axis direction of the molecules. The negative liquid crystals are arranged perpendicular to an electric field direction in an electric field. The negative liquid crystal molecules have the characteristics of high transmittance and high contrast.

Referring to FIG. 1, an embodiment of the present disclosure further provides a manufacturing method of a liquid crystal display panel, including:

A step S1 of providing a first substrate and a second substrate each provided with a polyimide (PI) alignment film, wherein the first substrate is a color film substrate, and the second substrate is a thin film transistor substrate.

A step S2 of filling the liquid crystal material including the negative liquid crystal molecules and the one or more thiol polymerizable monomers between the first substrate and the second substrate, and adding a double bond branched chain to a polyimide molecular chain of the polyimide alignment films; or filling the liquid crystal material including the negative liquid crystal molecules, the one or more thiol polymerizable monomers, and the one or more double bond polymerizable monomers between the first substrate and the second substrate.

A step S3 of applying a voltage (the voltage is 10-25V) to the liquid crystal material between the first substrate and the second substrate to deflect a plurality of negative liquid crystal molecules and a plurality of polymerizable monomers, and irradiating the liquid crystal material with an ultraviolet light (the ultraviolet light accumulated light quantity is 3000-7000 $mJ/cm^2$) while applying the voltage to induce a click chemical reaction between a plurality of thiol polymerizable monomers and the double bond branched chain on the polyimide alignment film, or between the thiol polymerizable monomers and a plurality of double bond polymerizable monomers, so as to generate a polymer, wherein the generated polymer is deposited on a side of the first substrate facing toward the liquid crystal material to form the first polymer film; and the generated polymer is deposited on a side of the second substrate facing toward the liquid crystal material to form a second polymer film.

A step S4 of removing the voltage and the ultraviolet light, to complete the manufacture of the liquid crystal display panel.

Specifically, a structural formula of the double bond branched chain is $CH_2=C(CH_3)$—COO—, $CH_2=CH$—COO—, $CH_2=CH$—O—, or $CH_2=CH$—$CH_2$—O—. When irradiated with the ultraviolet light, the double bond branched chain on the polyimide alignment film and the thiol polymerizable monomers occur a click chemical reaction to form a polymer, and the polymer is directly grafted on the polyimide molecular chain of the polyimide alignment film.

First Embodiment

Referring to FIGS. 2a-2d, this embodiment provides a manufacturing method of a liquid crystal display panel, including:

A step S1 of providing a first substrate 11 and a second substrate 12. The first substrate 11 is a color filter substrate, the second substrate 12 is a thin film transistor substrate, a first polyimide alignment film 21 is disposed on the first substrate 11, and a second polyimide alignment film 22 is disposed on the second substrate 12. The polyimide molecular chains of the first polyimide alignment film 21 and the second polyimide alignment film 22 are modified with $CH_2=C(CH_3)$—COO—, $CH_2=C(CH_3)$—COO— is the double bond branched chain 23 of the first polyimide alignment film 21 and the second polyimide alignment film 22.

A step S2 of filling a liquid crystal material between the first substrate 11 and the second substrate 12, the liquid crystal material includes negative liquid crystal molecules 41 and thiol polymerizable monomers 33.

A structural formula of thiol polymerizable monomer is:

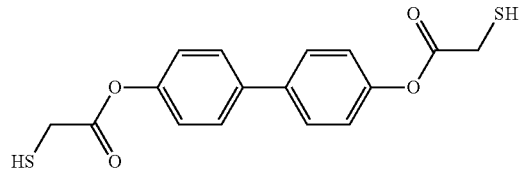 [SMILES: O=C(CS)Oc1ccc(-c2ccc(OC(=O)CS)cc2)cc1]

Mass percentages of negative liquid crystal molecules and thiol polymerizable monomers are respectively 99.5% and 0.5%.

The liquid crystal material and a photoinitiator are uniformly mixed, the mixture of the liquid crystal material and the photoinitiator and sealant is dropped on the first substrate 11 by a drop fill (ODF) manner, and an electrical conductivity glue is coated on a periphery of the first substrate 11. The first substrate 11 and the second substrate 12 are attached under a vacuum environment, and the sealant is cured. The curing method is an ultraviolet light curing and a thermal curing, and the state at this time is shown in FIG. 2a.

Figure 2B:
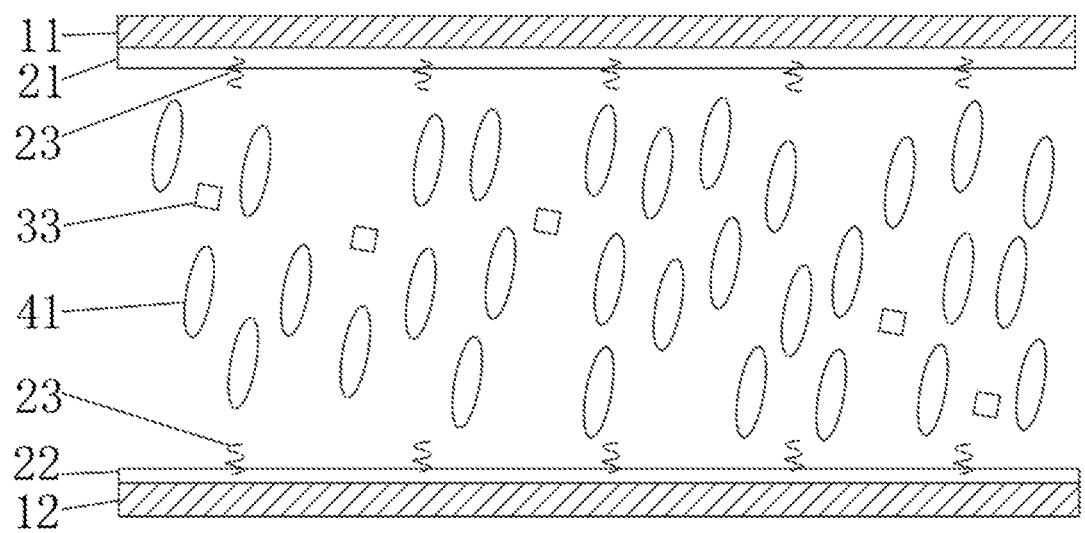
FIG. 2b is a schematic view of the manufacturing method of the liquid crystal display panel of the first embodiment after applying a voltage in a step S3.
Figure 2C:
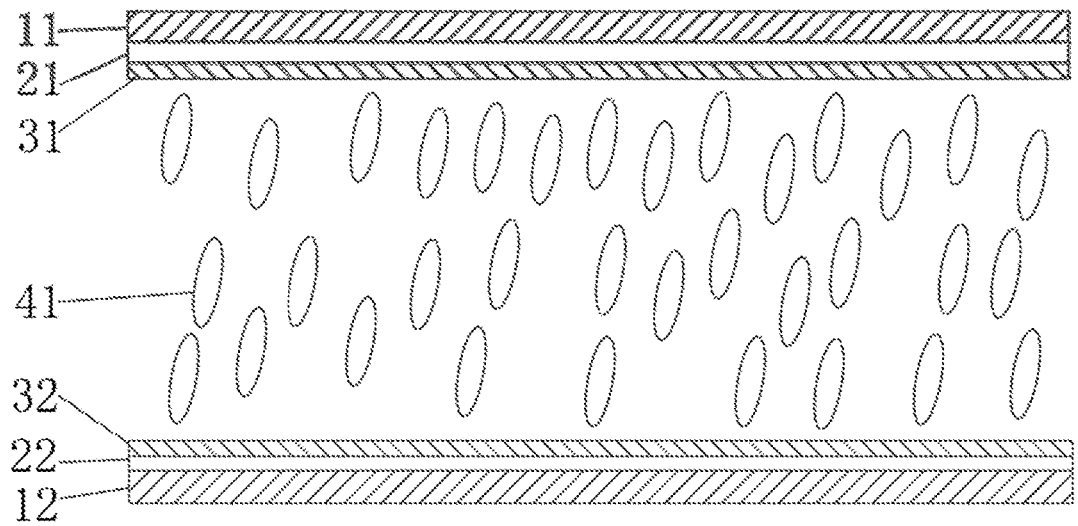
FIG. 2c is a schematic view of the manufacturing method of the liquid crystal display panel of the first embodiment after irradiating with an ultraviolet light in the step S3.

A step S3 of applying a voltage to the liquid crystal material between the first substrate 11 and the second substrate 12, the voltage is 15V, to deflect the negative liquid crystal molecules 41, the thiol polymerizable monomers 33 and the double bond branched chain 23, as shown in FIG. 2b. While the voltage is applied, the liquid crystal material is irradiated with an ultraviolet light, and an accumulated light quantity of the ultraviolet light is 4000 $mJ/cm^2$, so that the thiol polymerizable monomers 33 respectively occur a click chemistry reaction with the double bond branched chain 23 on the first polyimide alignment film 21, and the double bond branched chain 23 on the second polyimide alignment film 22 to generate a polymer. The generated polymer is directly grafted on the polyimide molecular chain, so as to form a first polymer film 31 on a side of the first substrate 11 facing toward the liquid crystal material and form a second polymer film 32 on a side of the second substrate 12 facing toward the liquid crystal material. The first polymer film 31 and the second polymer film 32 are used to anchor an orientation state of the negative liquid crystal molecules 41. The state at this time is shown in FIG. 2c.

Figure 2D:
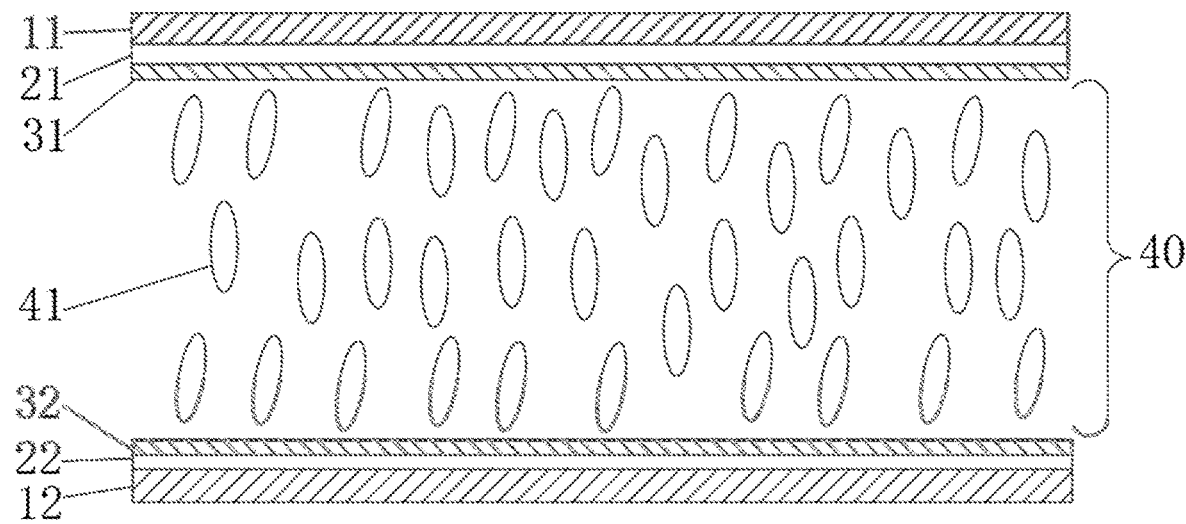
FIG. 2d is a schematic view of a completed liquid crystal display panel manufactured in a step S4 of the manufacturing method of the liquid crystal display panel of the first embodiment.

A step S4 of removing the voltage and the ultraviolet light, and removing the thiol polymerizable monomers 33 of the liquid crystal material to form the liquid crystal layer 40, to complete the manufacture of the liquid crystal display panel, and the negative liquid crystal molecules 41 form a uniform pretilt angle, as shown in FIG. 2d.

The first polymer film 31 is directly grafted on the first polyimide alignment film 21, and the second polymer film 32 is directly grafted on the second polyimide alignment film 22, so the liquid crystal display panel is more reliable.

Second Embodiment

Referring to FIGS. 3a-3d. This embodiment provides a manufacturing method of a liquid crystal display panel, including:

A step S1 of provide a first substrate 11 and a second substrate 12. A first polyimide alignment film 21 is disposed on the first substrate 11, and a second polyimide alignment film 22 is disposed on the second substrate 12. The first substrate 11 is a color filter substrate, and the second substrate 12 is a thin film transistor substrate.

A step S2 of filling a liquid crystal material between the first substrate 11 and the second substrate 12, the liquid crystal material includes negative liquid crystal molecules 41, thiol polymerizable monomers 33, and double bond polymerizable monomers 34.

A structural formula of thiol polymerizable monomer is:

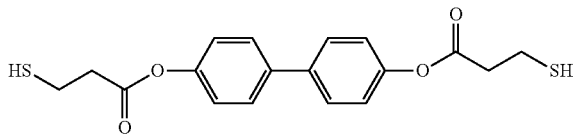 [SMILES: O=C(CCS)Oc1ccc(-c2ccc(OC(=O)CCS)cc2)cc1]

A structural formula of double bond polymerizable monomer is:

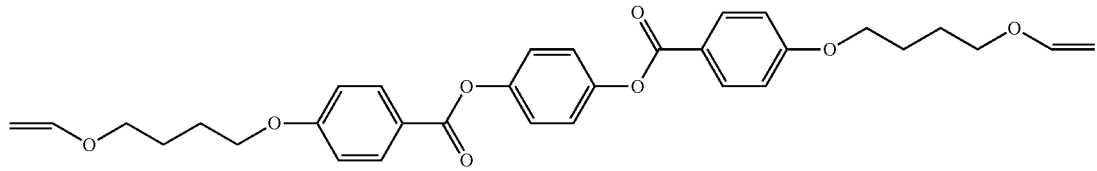 [SMILES: C=COCCCCOc1ccc(C(=O)Oc2ccc(OC(=O)c3ccc(OCCCCOC=C)cc3)cc2)cc1]

Mass percentages of the negative liquid crystal molecules, the thiol polymerizable monomers, and the double bond polymerizable monomers are separately 99%, 0.5% and 0.5%.

The liquid crystal material and a photoinitiator are uniformly mixed, the mixture of the liquid crystal material and the photoinitiator and sealant is dropped on the first substrate 11 by a drop fill (ODF) manner, and an electrical conductivity glue is coated on a periphery of the first substrate 11.

Figure 3A:
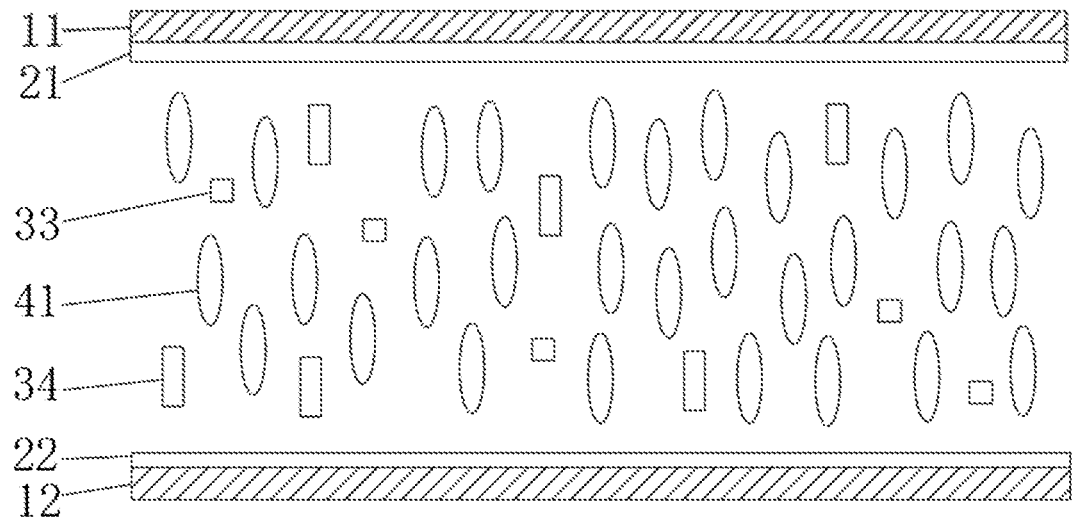
FIG. 3a is a schematic view of a step S2 of a manufacturing method of a liquid crystal display panel of a second embodiment.
Figure 3B:
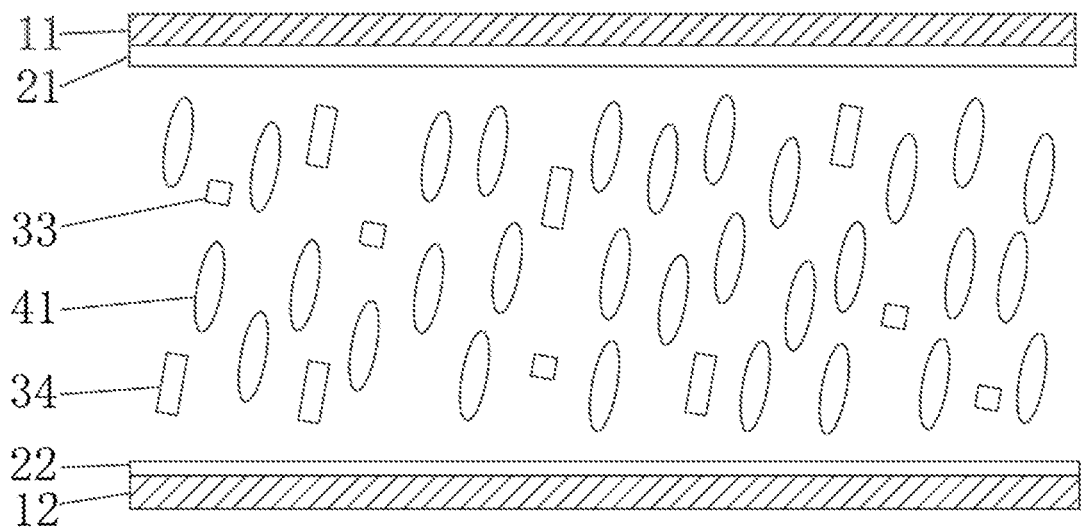
FIG. 3b is a schematic view of the manufacturing method of the liquid crystal display panel of the second embodiment after applying a voltage in a step S3.

The first substrate 11 and the second substrate 12 are attached under a vacuum environment, and the sealant is cured. The curing method is an ultraviolet light curing and a thermal curing, and the state at this time is shown in FIG. 3a.

Figure 3C:
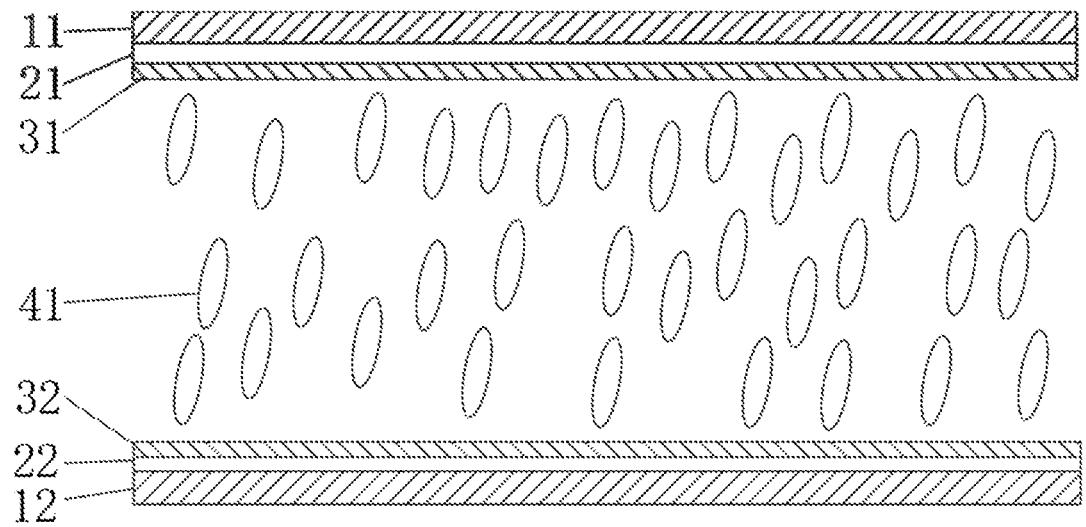
FIG. 3c is a schematic view of the manufacturing method of the liquid crystal display panel of the second embodiment after irradiating an ultraviolet light in the step S3.

A step S3 of applying a voltage to the liquid crystal material between the first substrate 11 and the second substrate 12, the voltage is 15V, to deflect the negative liquid crystal molecules 41, the thiol polymerizable monomers 33 and the double bond polymerizable monomers 34, and the state at this time is shown in FIG. 2b. While the voltage is applied, the liquid crystal material is irradiated with an ultraviolet light, and an accumulated light quantity of the ultraviolet light is 4000 mJ/cm$^2$, so that the thiol polymerizable monomers 33 occur a click chemistry reaction with the double bond polymerizable monomers 34 to generate a polymer. The generated polymer is deposited on a side of the first substrate 11 facing toward the liquid crystal material to form a first polymer film 31, and deposited on a side of the second substrate 12 facing toward the liquid crystal material to form a second polymer film 32. The first polymer film 31 and the second polymer film 32 are used to anchor an orientation state of the negative liquid crystal molecules 41. The state at this time is shown in FIG. 3c.

Figure 3D:
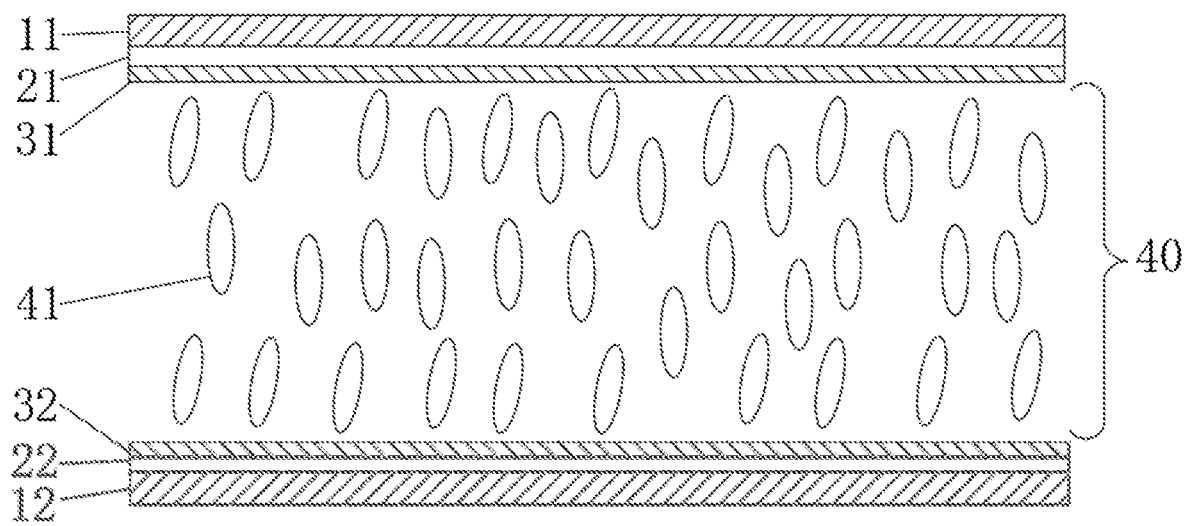
FIG. 3d is a schematic view of a completed liquid crystal display panel manufactured in a step S4 of the manufacturing method of the liquid crystal display panel of the second embodiment.

A step S4 of removing the voltage and the ultraviolet light, and removing the thiol polymerizable monomers 33 and the double bond polymerizable monomers 34 of the liquid crystal material to form the liquid crystal layer 40, to complete the manufacture of the liquid crystal display panel, and the negative liquid crystal molecules 41 form a uniform pretilt angle, as shown in FIG. 3d.

Preferably, the photoinitiator is one or more of azodiisobutyrodinitrile, dioxane peroxide compounds, diacyl peroxide compounds and lipid peroxide compounds, and an amount of photoinitiator can be set according to specific needs by those skilled in the art. Due to the fast click chemical reaction rates and high conversion rates of the thiol of the thiol polymerizable monomers and the double bond, the amount of photoinitiator is less than that used in the preparation of polymer films in the prior art.

Figure 4:
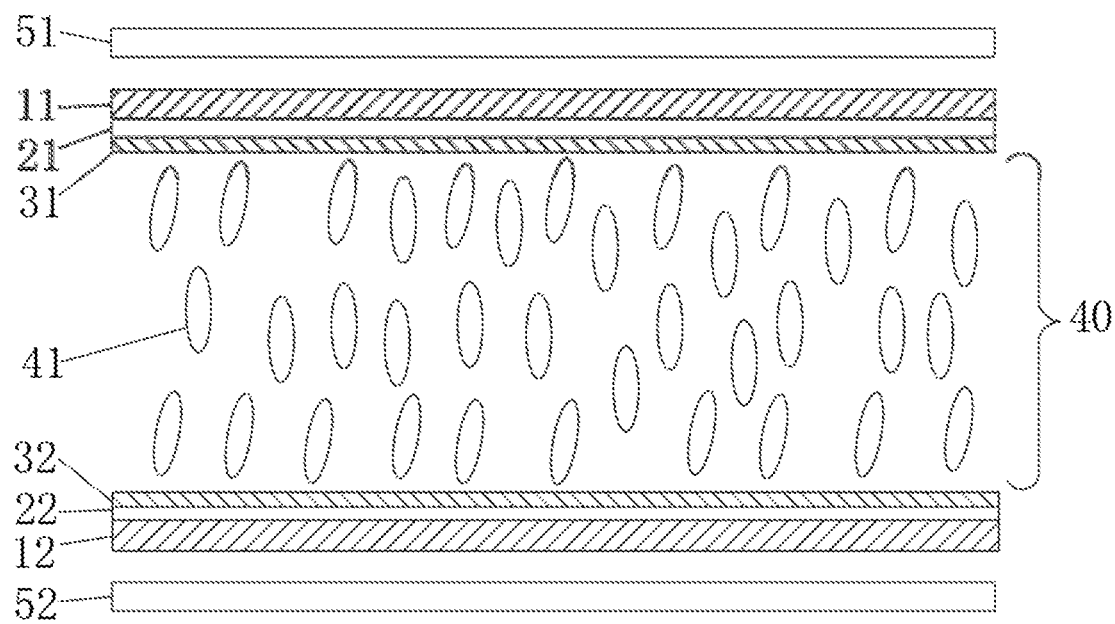
FIG. 4 is a schematic structural view of a liquid crystal display panel provided by the present disclosure.

Referring to FIG. 4, an embodiment of the present disclosure further provides a liquid crystal display panel, including: a first substrate 11 as a color film substrate; a second substrate 12 as a thin film transistor substrate. The first substrate 11 is disposed opposite to the second substrate 12. A first polyimide alignment film 21 is provided on an inner side of the first substrate 11. A second polyimide alignment film 22 is provided on an inner side of the second substrate 12. A liquid crystal layer 40 is disposed between the first polyimide alignment film 21 and the second polyimide alignment film 22. The liquid crystal layer 40 includes negative liquid crystal molecules 41. A first polymer film 31 is formed between the first polyimide alignment film 21 and the liquid crystal layer 40. A second polymer film 32 is formed between the second polyimide alignment film 22 and the liquid crystal layer 40. The first polymer film 31 and the second polymer film 32 are formed by a click chemical reaction between a plurality of thiol polymerizable monomers and a double bond branched chain on the polyimide alignment film, or between the thiol polymerizable monomers and a plurality of double bond polymerizable monomers, that is, the first polymer film 31 and the second polymer film 32 are polymerizable by a "thiol-double bond" polymerization system.

The liquid crystal display panel of the present disclosure further includes a first polarizer 51 and a second polarizer 52. The first polarizer 51 is disposed on an outside of the first substrate 11, and the second polarizer 52 is disposed on an outside of the second substrate 12. The first polarizer 51 is an upper polarizer, and the second polarizer 52 is a lower polarizer.

The ultraviolet light accumulated light quantity of the present disclosure is 3000-7000 mJ/cm$^2$, while the ultraviolet light accumulated light quantity of the currently mass-produced non-thiol monomer polymerization system is generally 7000-11000 mJ/cm$^2$. The polymerization conditions of the present disclosure are more moderate, and the ultraviolet light is less destructive to the liquid crystal materials. Moreover, compared with the pure double bond polymerization system, the "thiol-double bond" polymerization system of the present disclosure has more moderate polymerization conditions, less required amount of ultraviolet photoinitiator, and less damage to the liquid crystal material by the ultraviolet light, thereby improving the reliability of the liquid crystal material, and reducing the risk of image sticking displayed on the panel.

The above are only the preferred embodiments of the present disclosure and are not intended to limit the present disclosure. Any modification, equivalent replacement and simple improvement made on the substantive content of the present disclosure all should be included in the protection scope of the present disclosure.

INDUSTRIAL APPLICABILITY

The present disclosure provides a liquid crystal material, a manufacturing method thereof, and a liquid crystal display panel, which use a click chemical reaction between "thiol and double bond" to prepare a polymer film. The polymerization conditions are more moderate, the introduced impurities are less, and the UV damage to the liquid crystal material is less, so as to reduce energy consumption, improve production capacity and reduce the image sticking risk of the panel display. The present disclosure solve the existing problems that the curing process of liquid crystal materials is cumbersome, two-step ultraviolet light curing causes the liquid crystal material to be greatly damaged by the ultraviolet light, and the risk of image sticking of the display panel is high.

The invention claimed is:

1. A liquid crystal display panel, comprising:
a first substrate as a color film substrate;
a second substrate as a thin film transistor substrate and disposed opposite to the first substrate;
a first polyimide alignment film provided on an inner side of the first substrate;
a second polyimide alignment film provided on an inner side of the second substrate;
a liquid crystal layer disposed between the first polyimide alignment film and the second polyimide alignment film;
a first polymer film formed between the first polyimide alignment film and the liquid crystal layer; and
a second polymer film formed between the second polyimide alignment film and the liquid crystal layer,
wherein the first polymer film and the second polymer film are formed by a click chemical reaction between a plurality of thiol polymerizable monomers and a double bond branched chain on the polyimide alignment film, or between the thiol polymerizable monomers and a plurality of double bond polymerizable monomers,
wherein a structural formula of the thiol polymerizable monomers is shown in a formula (I):

$$\text{HS}-X_1-A_1-Z_1-(A_2-Z_2)n-A_3-X_2-\text{SH} \quad (I)$$

wherein, in the formula (I), $X_1$ and $X_2$ are independently selected from a C1-C6 linear alkylene group, or a group thereof having one or a plurality of non-adjacent —$CH_2$— groups of the C1-C6 linear alkylene group substituted with one or more group of —O—, —S—, —COO— and —OCO—;
$A_1$, $A_2$ and $A_3$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and
$Z_1$ and $Z_2$ are independently selected from —$CH_2$—, —COO—, —C=C—, or —O—; and
wherein n is 0 or 1; or
wherein, in the formula (I), $X_1$ and $X_2$ are independently selected from —$CH_2$—, or —$CH_2CH_2$—;
$A_1$, $A_2$ and $A_3$ are independently selected from 1,4-benzene ring, or trans-1,4-cyclohexane;
$Z_1$ and $Z_2$ are independently selected from —COO—, or —O—; and
wherein n is 0.

2. The liquid crystal display panel according to claim 1, wherein the structural formula of the double bond branched chain is $CH_2$=$C(CH_3)$—COO—, $CH_2$=CH—COO—, $CH_2$=CH—O—, or $CH_2$=CH—$CH_2$—O—.

3. The liquid crystal display panel according to claim 1, wherein the structural formula of the double bond branched chain is $CH_2$=$C(CH_3)$—COO—.

4. The liquid crystal display panel according to claim 1, wherein the liquid crystal layer further comprises one or more double bond polymerizable monomers, and a structural formula of the double bond polymerizable monomer is shown in formula (II):

$$\text{P}-X_3-A_4-Z_3-(A_5-Z_4)m-A_6-X_4-\text{P} \quad (II)$$

wherein, in the formula (II), P is selected from acrylate group, methacrylate group, vinyl ether group or allyl ether group;
$X_3$ and $X_4$ are independently selected from a C1-C6 linear alkylene group, or a group thereof having one or a plurality of non-adjacent —$CH_2$— groups of the C1-C6 linear alkylene group substituted with one or more group of —O—, —S—, —COO— and —OCO—;
$A_4$, $A_5$ and $A_6$ are independently selected from 1,4-benzene ring, 2-5-pyrimidine ring, 1,2,6-naphthalene ring, or trans-1,4-cyclohexane, or selected from a group thereof having one or more active sites in the 1,4-benzene ring, 2-5-pyrimidine ring, 1,2,6-naphthalene ring, or trans-1,4-cyclohexane substituted with one or more of methyl group, halogen atom and cyan group; and $Z_3$ and $Z_4$ are independently selected from —$CH_2$—, —COO—, —C=C—, or —O—; and wherein m is 0 or 1.

5. The liquid crystal display panel according to claim 1, wherein the liquid crystal layer comprising a plurality of negative liquid crystal molecules, the thiol polymerizable monomers, and/or the double bond polymerizable monomers.

6. The liquid crystal display panel according to claim 5, wherein when the first polymer film and the second polymer film are formed by the click chemical reaction between the thiol polymerizable monomers and the double bond branched chain on the polyimide alignment film, and a mass fraction of the negative liquid crystal molecules ranges from 98% to 99.95%, and a mass fraction of the thiol polymerizable monomers in the liquid crystal layer ranges from 0.05% to 2.0%.

7. The liquid crystal display panel according to claim 5, wherein when the first polymer film and the second polymer film are formed by the click chemical reaction between the thiol polymerizable monomers and the double bond branched chain on the polyimide alignment film, and a mass fraction of the negative liquid crystal molecules is 99.5%, and a mass fraction of the thiol polymerizable monomers in the liquid crystal layer is 0.5%.

8. The liquid crystal display panel according to claim 5, wherein when the first polymer film and the second polymer film are formed by the click chemical reaction between the thiol polymerizable monomers and the double bond polymerizable monomers, wherein a mass fraction of the negative liquid crystal molecules ranges from 98% to 99.95%, a mass fraction of the thiol polymerizable monomers in the liquid crystal layer ranges from 0.05% to 2.0%, and a mass fraction of the double bond polymerizable monomers in the liquid crystal layer ranges from 0.05% to 1.0%.

9. The liquid crystal display panel according to claim 5, wherein whein the first polymer film and the second polymer film are formed by the click chemical reaction between the thiol polymerizable monomers and the double bond polymerizable monomers, wherein a mass fraction of the negative liquid crystal molecules is 99%, a mass fraction of the thiol polymerizable monomers in the liquid crystal layer is 0.5%, and a mass fraction of the double bond polymerizable monomers in the liquid crystal layer is 0.5%.

* * * * *